United States Patent
Suzue et al.

(10) Patent No.: US 10,500,692 B2
(45) Date of Patent: Dec. 10, 2019

(54) LENS EDGING SYSTEM, ORDER-SIDE TERMINAL DEVICE AND LENS ORDERING METHOD

(71) Applicant: HOYA CORPORATION, Tokyo (JP)

(72) Inventors: Takahiro Suzue, Tokyo (JP); Takashi Daimaru, Tokyo (JP); Hiroshi Yoshizaki, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 964 days.

(21) Appl. No.: 14/655,519

(22) PCT Filed: Dec. 17, 2013

(86) PCT No.: PCT/JP2013/083754
§ 371 (c)(1),
(2) Date: Jun. 25, 2015

(87) PCT Pub. No.: WO2014/103800
PCT Pub. Date: Jul. 3, 2014

(65) Prior Publication Data
US 2015/0352681 A1 Dec. 10, 2015

(30) Foreign Application Priority Data
Dec. 25, 2012 (JP) .................. 2012-281174

(51) Int. Cl.
*B24B 49/00* (2012.01)
*G01B 5/20* (2006.01)
(Continued)

(52) U.S. Cl.
CPC ............ *B24B 9/148* (2013.01); *B24B 9/14* (2013.01); *B24B 49/00* (2013.01); *G01B 5/20* (2013.01);
(Continued)

(58) Field of Classification Search
CPC .. B24B 9/14; B24B 9/148; G02C 7/02; G02C 7/024; G02C 7/027; G02C 7/028;
(Continued)

(56) References Cited

U.S. PATENT DOCUMENTS 5,450,335 A * 9/1995 Kikuchi .................. B24B 9/144
356/601
5,485,399 A * 1/1996 Saigo ...................... B24B 9/148
351/178

(Continued)

FOREIGN PATENT DOCUMENTS

| JP | H04-13539 A | 1/1992 |
| JP | H06-34923 A | 2/1994 |
| WO | 2007/077848 A1 | 7/2007 |

OTHER PUBLICATIONS

Sep. 26, 2016 Extended Search Report issued in European Patent Application No. 13866797.7.

(Continued)

*Primary Examiner* — Eileen P Morgan
(74) *Attorney, Agent, or Firm* — Oliff PLC

(57) ABSTRACT

A lens edging system, including: a spectacle frame measurement device and an order-side terminal device disposed at a spectacle lens order side; and an order-receiving side controller disposed at a spectacle lens order-receiving side, wherein the order-side terminal device and the order-receiving side controller are connected to each other via a communication line, the system further including: an information memory part for storing and holding information regarding a shape of a probe in the spectacle frame measurement device as probe information; and an edging shape calculation part for performing data correction reflecting an abutting mode of the probe indicated by the probe information when lens edging shape data is created at the spectacle lens order-receiving side, wherein a suitable size correction can be performed even when a frame shape of any kind of a spectacle frame is measured by the spectacle frame measurement device by performing the data correction.

6 Claims, 10 Drawing Sheets

(51) Int. Cl.
  *B24B 9/14* (2006.01)
  *G02C 7/02* (2006.01)
  *G05B 19/418* (2006.01)
  *G01B 11/24* (2006.01)
  *G06Q 30/06* (2012.01)
(52) U.S. Cl.
  CPC ............... *G01B 11/24* (2013.01); *G02C 7/02* (2013.01); *G02C 7/027* (2013.01); *G02C 7/028* (2013.01); *G05B 19/418* (2013.01); *G06Q 30/0621* (2013.01)
(58) Field of Classification Search
  CPC ...... G01B 5/20; G01B 11/24; G06Q 30/0621; G05B 19/418; G05B 2219/32022; G05B 2219/37375; G05B 2219/45157; G05B 2219/45275
  USPC ..................................... 451/255, 256, 43, 44
  See application file for complete search history.

(56) References Cited

U.S. PATENT DOCUMENTS

| | | | | |
|---|---|---|---|---|
| 8,220,168 | B2* | 7/2012 | Miyashita | G01B 5/20 33/200 |
| 2005/0073650 | A1* | 4/2005 | Ito | G02C 7/021 351/200 |
| 2006/0276106 | A1* | 12/2006 | Inoguchi | B24B 9/148 451/5 |
| 2009/0067940 | A1* | 3/2009 | Arai | B24B 9/14 408/22 |
| 2009/0222122 | A1* | 9/2009 | Daimaru | G02C 13/003 700/98 |
| 2013/0260642 | A1* | 10/2013 | Kikuchi | B24B 9/144 451/5 |
| 2014/0199916 | A1* | 7/2014 | Takeichi | B24B 51/00 451/5 |
| 2014/0302749 | A1* | 10/2014 | Samukawa | G05B 19/19 451/5 |
| 2015/0049304 | A1* | 2/2015 | Cussac | G02C 7/028 351/159.75 |
| 2016/0161761 | A1* | 6/2016 | Quere | B29C 64/124 427/164 |

OTHER PUBLICATIONS

Jan. 28, 2014 Search Report issued in International Patent Application No. PCT/JP2013/083754.

Jun. 30, 2015 International Preliminary Report on Patentability issued in International Patent Application No. PCT/JP2013/083754.

* cited by examiner

FIG. 6(a) Perspective view

FIG. 6(b) Plan view

LENS EDGING SYSTEM, ORDER-SIDE TERMINAL DEVICE AND LENS ORDERING METHOD

TECHNICAL FIELD

The present invention relates to a lens edging system used for edging a spectacle lens, an order-side terminal device used in this lens edging system, and a lens ordering method.

In recent years, in a spectacle field, a communication type lens edging system is used (for example, see patent document 1). In the communication type lens edging system, an order-side terminal device installed in a spectacle shop (namely, an order side of a spectacle lens), and a receiving side controller installed in an edging center (namely, an edging side of a spectacle lens) of a spectacle lens manufacturer, are communicated with each other via a communication line such as Internet, etc. Then, at a spectacle shop side, a three-dimensional frame shape of a spectacle frame is measured using a spectacle frame measurement device connected to the order-side terminal device, and thereafter three-dimensional frame shape data as a measurement result is transmitted to the receiving side controller together with data regarding lens kind, lens material, and lens prescription value, etc., inputted in the order-side terminal device, to thereby perform ordering of the spectacle lens. Meanwhile, at the side of the edging center, edging is performed to a circumferential edge portion of an uncut lens using an edger managed by the receiving side controller, so that a lens can be framed into the spectacle frame indicated by the three-dimensional frame shape data received by the receiving side controller, and the spectacle lens after edging is delivered to the spectacle shop which is an order source.

Incidentally, in such a communication type lens edging system, for example, when it is configured to perform ordering by a plurality of spectacle shops to one edging center, various models of the spectacle frame measurement devices can be installed at the side of each spectacle shop. Regarding the spectacle frame measurement device, the shape, etc., of a probe (stylus) that abuts on an inner circumferential groove of the spectacle frame is sometimes different, depending on a model of the device. Therefore, when the communication type lens edging system is constructed, it is necessary to obtain the same measurement result of the same spectacle frame, even if measurement is performed by any kind of the model of the spectacle frame measurement device. Therefore, regarding the communication type lens edging system, it is proposed that by paying attention to a circumferential length of a frame inner circumference of the spectacle frame as a reference frame, a size correction value is previously set according to the difference of the model, etc., of the spectacle frame measurement device, to thereby correct a measurement error of the three-dimensional frame shape of the spectacle frame (for example, see patent document 2).

PRIOR ART DOCUMENT

Patent document

Patent document 1: Patent Laid Open Publication No. Hei06-34923
Patent document 2: International Publication No. 2007/077848

SUMMARY OF THE INVENTION

Problem to be Solved by the Invention

However, in the size correction in a conventional lens edging system, it cannot be necessarily said that a sufficient accuracy can be secured for performing edging to a spectacle lens so as to be framed into a spectacle frame.

In the size correction in the conventional lens edging system, for example, as shown in patent document 2, the three-dimensional frame shape of a reference frame is measured by a spectacle frame measurement device, and a size correction value is previously set so that a circumferential length value indicated from the measurement result is the same or close to an original circumferential length value of the reference frame, to thereby correct a measurement error due to a difference of a model, etc., of the spectacle frame measurement device. Therefore, regarding the spectacle frame using the same size correction value as the size correction value for the reference frame, even in a case of three-dimensional frame shape data A obtained by measurement by a stylus shape (for example, flat plate shape) of the spectacle frame measurement device of A corporation, or even in a case of three-dimensional frame shape data B obtained by measurement by a stylus shape (for example. a spherical shape) of the spectacle frame measurement device of B corporation, size correction can be performed so that both sizes are equal to each other, using the previously set size correction value.

However, regarding the spectacle frame having a completely different shape from the reference frame, when each three-dimensional frame shape data A and B as a measurement result, is respectively corrected by the previously set size correction value, both sizes are not necessarily equal to each other. This is a problem generated by the difference of the stylus shapes between spectacle frame measurement devices of A corporation and B corporation. The spectacle frame has various frame shapes other than the reference frame, and is different from each other, depending on a frame shape, a frame curve, and a frame tilt angle, etc. Therefore, if the stylus shape is different, butting of the stylus (butting mode) against the inner circumferential groove of each spectacle frame is also different. Accordingly, even if the previously set same size correction value is applied to each spectacle frame, a suitable size correction is not necessarily performed.

It can be considered that this problem can be responded by setting a different size correction value for each spectacle frame. However, it is not operational and not practical to previously set an individual size correction value for all spectacle frames having various frame shapes.

Therefore, an object of the present invention is to provide a lens edging system, an order-side terminal device and a lens ordering method, capable of performing suitable size correction to three-dimensional frame shape data regarding any kind of spectacle frame, and capable of constructing a mechanism of supplying a spectacle lens that can be framed into a spectacle frame with high quality.

Means for Solving the Problem

In order to achieve the above-described object, first, inventors of the present invention examine a size correction performed to three-dimensional frame shape data of a spectacle frame. As described above, the size correction cannot be necessarily suitably performed even if the same size correction value is uniformly used, and it is not practical to set an individual size correction value for each spectacle frame. Namely, regarding the size correction of the three-dimensional frame shape data, it is conceivable that a new size correction mechanism is required, exceeding a concept that the size is corrected by a previously set size correction value.

Regarding this point, as a result of further strenuous efforts by the inventors of the present invention, an unconventional new concept is achieved as follows: by using information regarding a shape of a probe used by a spectacle frame measurement device, a manner of abutting of the probe against an inner circumferential groove of a spectacle frame (abutting mode) is indicated, and thereafter if three-dimensional frame shape data obtained by the spectacle frame measurement device can be converted to new shape data, etc., so as to reflect the abutting mode of the probe, the size correction reflecting the abutting mode of the probe can be performed to the three-dimensional frame shape data as a result, regardless of the shape, etc., of the model of the spectacle frame measurement device or the shape, etc., of the probe used by the spectacle frame measurement device.

Based on such a new concept by the inventors of the present invention, the present invention is provided.

According to a first aspect of the present invention, there is provided a lens edging system, including:

a spectacle frame measurement device configured to measure a three-dimensional frame shape of a spectacle frame by abutting a probe on an inner circumferential groove of the spectacle fame;

an order-side terminal device configured to perform ordering of a spectacle lens that can be framed into the spectacle frame whose three-dimensional frame shape data is obtained using three-dimensional frame shape data as a measurement result obtained by the spectacle frame measurement device;

an order-receiving side controller configured to receive an order from the order-side terminal device, and create lens edging shape data based on the three-dimensional frame shape data regarding an order content; and an edger configured to perform edging to the spectacle lens based on the lens edging shape data created by the order-receiving side controller, wherein the spectacle frame measurement device and the order-side terminal device are disposed at a spectacle lens order side, and the order-receiving side controller and the edger are disposed at a spectacle lens order-receiving side, and the order-side terminal device and the order-receiving side controller are connected to each other via a communication line, the lens edging system further including:

an information memory part configured to store and hold information regarding a shape of the probe in the spectacle frame measurement device as probe information; and an edging shape calculation part configured to perform data correction reflecting an abutting mode of the probe indicated by the probe information when the lens edging shape data is created.

According to a second aspect of the present invention, there is provided the lens edging system of the first aspect, wherein the information memory part is included in the order-side terminal device, and the order-side terminal device includes a probe information reporting part that reads the probe information obtained from the information memory part and reports it to the order-receiving side controller, when ordering of a spectacle lens is performed to the order-receiving side controller.

According to a third aspect of the present invention, there is provided the lens edging system of the first aspect, wherein the information memory part is provided at a certain place on the communication line, and the order-receiving side controller includes a probe information acquisition part for acquiring the probe information by accessing the information memory part, in addition to the edging shape calculation part.

According to a fourth aspect of the present invention, there is provided the lens edging system of the first aspect, wherein the information memory part is included in the order-side terminal device, and the order-side terminal device includes a shape data correction part that performs data correction reflecting an abutting mode of the probe indicated by the probe information stored in the information memory part, to three-dimensional shape data as a measurement result obtained by the spectacle frame measurement device, and ordering is performed to the order-receiving side controller using three-dimensional frame shape data after data correction by the shape data correction part at a side of the order-side terminal device.

According to a fifth aspect of the present invention, there is provided the lens edging system of the second or fourth aspect, wherein the order-side terminal device includes a probe information registration processing part for storing and holding the probe information in the information memory part.

According to a sixth aspect of the present invention, there is provided an order-side terminal device configured to receive three-dimensional frame shape data as a measurement result of a three-dimensional frame shape obtained from a spectacle frame measurement device that measures the tree-dimensional frame shape of a spectacle frame by making a probe abut on an inner circumferential groove of the spectacle frame, and perform ordering of a spectacle lens that can be framed into the spectacle frame using the three-dimensional frame shape data, to an order-receiving side controller that manages an edger that performs edging to the spectacle lens, the device including:

an information memory part configured to store and hold information regarding a shape of the probe in the spectacle frame measurement device; and a lens ordering part configured to read the probe information from the information memory part and report it to the order-receiving side controller, when ordering of a spectacle lens is performed to the order-receiving side controller, and make the order-receiving side controller perform data correction reflecting an abutting mode of the probe indicated by the probe information, for three-dimensional frame shape data regarding an order content.

According to a seventh aspect of the present invention, there is provided a lens ordering method for perform ordering of edging a spectacle lens, including:

the measurement step of obtaining three-dimensional frame shape data as a measurement result of a three-dimensional shape using a spectacle frame measurement device for measuring the three-dimensional frame shape of a spectacle frame by making a probe abut on an inner circumferential groove of the spectacle frame;

the acquiring step of acquiring probe information which is the information regarding a shape of the probe in the spectacle frame measurement device used in the measurement step; and an ordering step of performing ordering of a spectacle lens that can be framed into the spectacle frame to be measured in the measurement step using the three-dimensional frame shape data obtained in the measurement step, to an order-receiving side controller that manages an edger that performs edging of the spectacle lens, wherein in the ordering step, the probe information acquired in the acquiring step is reported to the order-receiving side controller when ordering of a spectacle lens is performed to the order-receiving side controller, so that data correction reflecting an abutting mode of the probe indicated by the probe information can be performed to the three-dimensional frame shape data, at a side of the order-receiving side controller.

Advantage of the Invention

According to the present invention, a suitable size correction can be performed to three-dimensional frame shape data regarding any kind of spectacle frame, regardless of a shape of a probe for measuring a frame shape of a spectacle frame, thus constructing a mechanism of supplying a spectacle lens that can be framed into a spectacle frame with high quality.

DETAILED DESCRIPTION OF THE INVENTION

Embodiments of the present invention will be described hereafter, based on the drawings.

In this embodiment, explanation is given in an order of the following items.
1. Schematic structure of an overall lens edging system
2. Function structure of an essential part of the lens edging system
3. Manufacturing procedure of a spectacle lens
   3-1. Measurement processing of a frame shape of a spectacle frame
   3-2. Ordering processing of a spectacle lens
   3-3. Order-reception processing of a spectacle lens
   3-4. Edging processing of a spectacle lens
4. Effect of this embodiment
5. Modified example, etc.

<1. Schematic Structure of an Overall Lens Edging System>

A schematic structure of an overall lens edging system will be described first.

Figure 1:
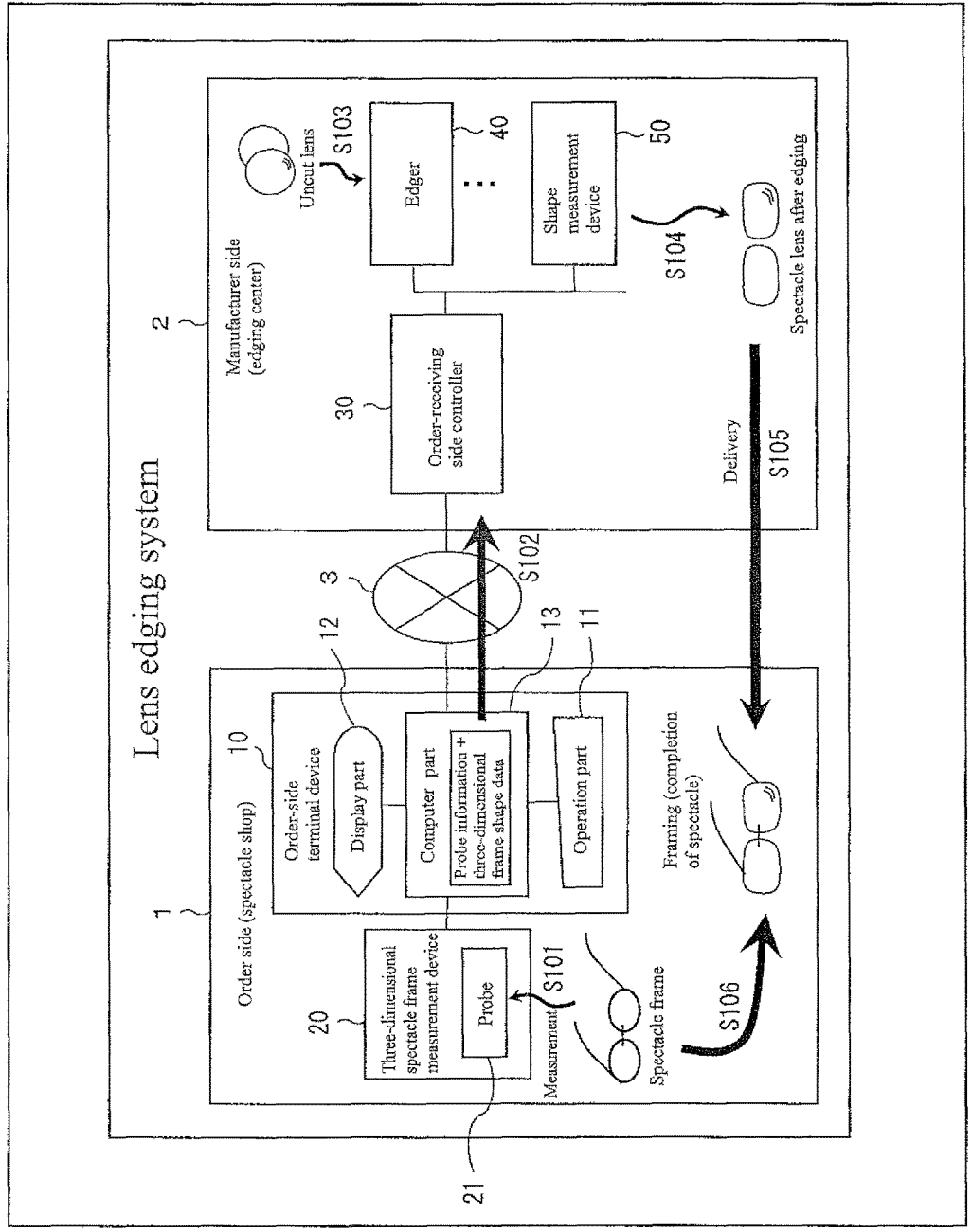
FIG. 1 is a block diagram showing a schematic constitutional example of an overall lens edging system according to an embodiment of the present invention.

FIG. 1 is a block diagram showing a schematic constitutional example of an overall lens edging system according to this embodiment.

The lens edging system of this embodiment is a so-called communication type system in which a spectacle shop 1 which is an order side of a spectacle lens, and an edging center 2 of a lens manufacturer which is a manufacturing and processing side of the spectacle lens, are connected to each other so as to communicate with each other via a communication line 3. An example of the figure shows a case that one spectacle shop 1 exists as the order side. However, actually a plurality of spectacle shops 1 exist, and each of them can communicate with the edging center 2 via the communication line 3. Further, the order side is not necessarily required to be the spectacle shop 1, and may exist in an office of a lens manufacturer or an edging center.

(Structure of the Order Side of the Spectacle Lens)

An order-side terminal device 10 and a three-dimensional spectacle frame measurement device (simply called a "spectacle frame measurement device" hereafter) 20 are installed in the spectacle shop 1 which is the order side of the spectacle lens.

The order-side terminal device 10 is configured including a computer part 13 provided with an operation part 11 such as a keyboard and mouse, etc., a displayer 12 such as a liquid crystal display, and CPU (Central Processing Unit), HDD (Hard Disk Drive), and a communication interface, etc. The communication line 3 is connected to the computer part 13. With this structure, as described later in detail, the order-side terminal device 10 can perform ordering of a spectacle lens, to the side of the edging center 2.

The order-side terminal device 10 may be a dedicated computer or may be a device in which software for ordering a lens is installed in a generic personal computer device. Further, WWW (World Wide Web) server is provided in an edging center 2 side network or relay station, and a document for ordering a lens registered in this WWW server may be displayed on a screen in a WWW browser of the order-side terminal device 10 so that ordering can be performed.

The spectacle frame measurement device 20 makes a probe (stylus) 21 abut on the inner circumferential groove of a spectacle frame, and measures three-dimensional frame shape of the spectacle frame. Then, when the three-dimensional frame shape of the spectacle frame is measured, the spectacle frame measurement device 20 reports three-dimensional frame shape data as a measurement result, to the order-side terminal device 10.

The spectacle frame measurement device 20 is not limited in its model, and various models of the device can be installed. Further, the spectacle frame measurement device 20 is not necessarily completely uniform in the shape of the probe 21, and the probe 21 can have a different shape such as a flat plate shape or a spherical shape, depending on the model.

(Structure of the Manufacturing and Processing Side of a Spectacle Lens)

An order-receiving side controller 30, an edger 40, and a shape measurement device 50 are installed in the edging center 2 which is the manufacturing and processing side of the spectacle lens.

The order-receiving side controller 30 is constituted of a computer device including CPU and a communication interface, etc. Further, the communication line 3 is connected to the order-receiving side controller 30, so that ordering of a spectacle lens from the order-side terminal device 10 can be received via the communication line 3. With this structure, as will be described later in detail, the order-receiving side controller 30 creates lens edging shape data required for edging, etc., of the spectacle lens in accordance with an order content obtained from the order-side terminal device 10, then uses the lens edging shape data, and gives an instruction to the edger 40 and the shape measurement device 50.

The edger 40 performs edging to the spectacle lens, in accordance with the instruction from the order-receiving side controller 30. Processing of the spectacle lens includes rough grinding (CG processing) and polishing. However, edging will be given here as an example of the processing applied to the spectacle lens, and explanation is given as follows. Namely, based on the lens edging shape data created by the order-receiving side controller 30, the edger 40 creates edging locus data for specifying a moving locus of an edging tool, and performs edging to the spectacle lens using this edging locus data. The edging is performed to an uncut lens (unedged lens) having a prescribed outer shape. By performing edging, the circumferential edge portion of the uncut lens is processed into a shape that can be framed into a spectacle frame.

It is needless to say that there is an edger (not shown) that performs CG processing or polishing, other than the edger 40 that performs edging in the edging center 2.

The shape measurement device 50 measures an edging shape of the circumferential edge portion of the spectacle lens after edging by the edger 40. By using the measurement result, edging quality of the spectacle lens can be judged after edging. It is conceivable that the shape measurement device 50 performs such a shape measurement in non-contact state using a laser displacement meter (for example, see International Patent Publication No. 2011/125829). However, it is not necessarily required to perform shape measurement in non-contact state using the laser displacement meter, etc., and if the edging quality can be judged, a circumferential length measurement machine may be used instead, for measuring a circumferential length of the circumferential edge portion of the spectacle lens.

(Structure of Communication Line)

The communication line 3 connecting the order-side terminal device 10 and the order-receiving side controller 30, may be used if it makes a communication between them (exchange of information or data, etc.). The communication line 3 is constructed using a public line network, dedicated line, and Internet, etc., for example. Further, the communication line 3 may have a relay station in the middle.

<2. Structure of a Function of an Essential Part of the Lens Edging>System

A structure of a function of an essential part of the lens edging system of this embodiment will be described next.

The lens edging system of this embodiment has a great characteristic different from a conventional lens edging system in a point that when ordering of a spectacle lens is performed to the edging center 2, not only the three-dimensional frame shape data as a measurement result obtained by the spectacle frame measurement device 20, but also the probe information which is the information regarding the shape of the probe 21 used by the spectacle frame measurement device 20, is transmitted to the order-receiving side controller 30 from the order-side terminal device 10. The probe information will be described later in detail.

In order to realize such a characteristic, the lens edging system of this embodiment has a function structure as described below.

Figure 2:
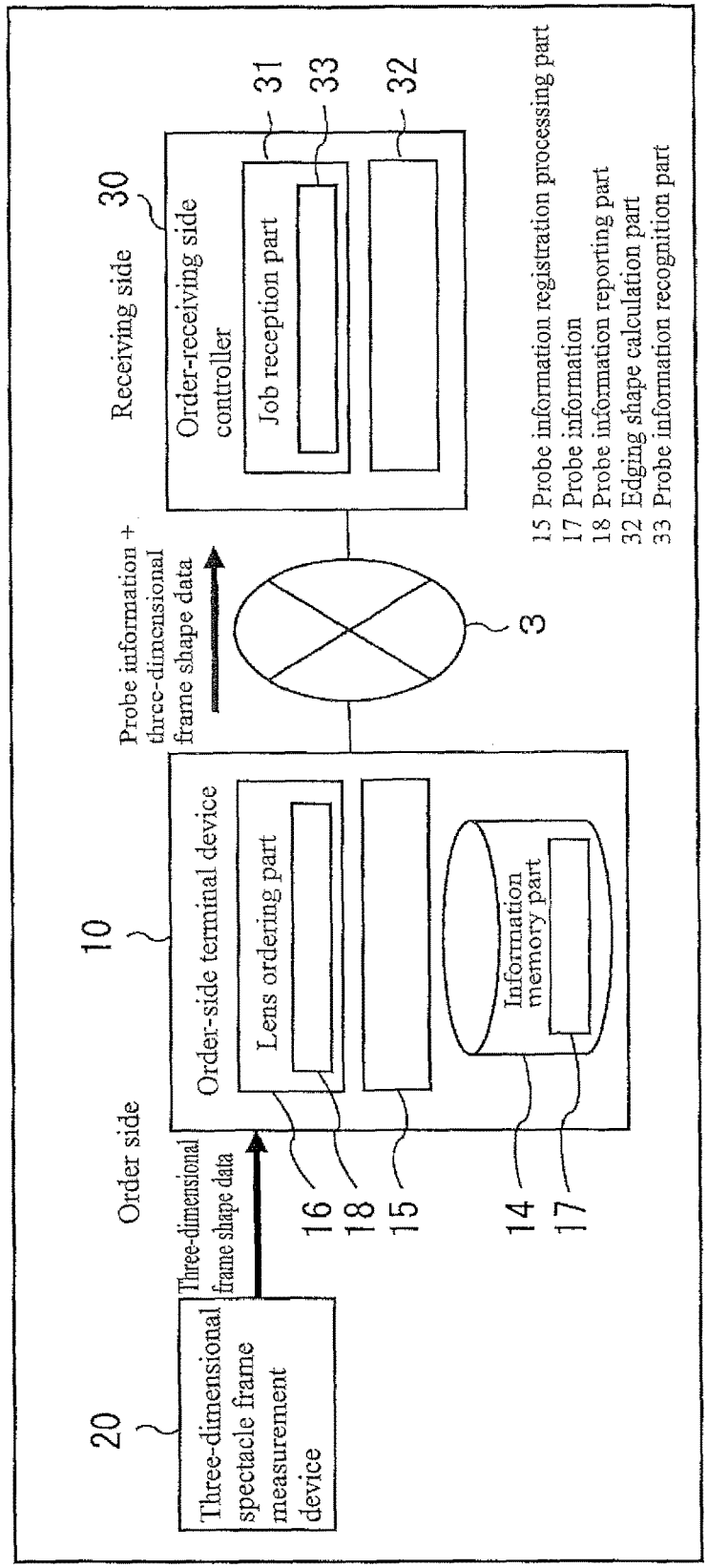
FIG. 2 is a block diagram showing a constitutional example of a function of an essential part of the lens edging system according to an embodiment of the present invention.

FIG. 2 is a block diagram showing a constitutional example of a function of an essential part of the lens edging system according to this embodiment.

(Function Structure of the Order-Side Terminal Device)

The order-side terminal device 10 has a function as the information memory part 14, the probe information registration processing part 15, and the lens ordering part 16.

The information memory part 14 stores and holds the information regarding the shape of the probe 21 in the spectacle frame measurement device 20 as the probe information 17. The function as the information memory part 14 is realized by securing a memory region in the HDD of the order-side terminal device 10.

The probe information 17 stored and held in the information memory part 14, is the information regarding the shape of the probe 21, and specifically corresponds to the information for specifying the type of the shape of the probe 21 (flat-plate shape or spherical shape), the size (dimension value), and a position as a reference at the time of measurement (for example, position of top of a tip portion).

The probe information registration processing part 15 performs registration processing for storing and holding the probe information 17 in the information memory part 14. The registration processing may be performed by inputting required information through the operation part 11 by an operator of the order-side terminal device 10, with reference to an input screen of this information.

The lens ordering part 16 performs ordering of a spectacle lens to the order-receiving side controller 30. When ordering of the spectacle lens is performed, the lens ordering part 16 prompts the operator of the order-side terminal device 10 to input through the operation part 11, data regarding the kind of the lens, the material of the lens, and a prescription value of the lens, etc., of a spectacle lens desired by a client, and receives from the spectacle frame measurement device 30 the three-dimensional frame shape data regarding the spectacle frame desired by the client, and transmits to the order-receiving side controller 30 the data regarding the kind of the lens, the material of the lens, and the prescription value, etc., of the lens inputted through the operation part 11, and the three-dimensional frame shape data reported from the spectacle frame measurement device 20. Namely, the lens ordering part 16 performs ordering of the spectacle lens that can be framed into the spectacle frame whose three-dimensional frame shape data is obtained, using the three-dimensional frame shape data as a measurement result obtained by the spectacle frame measurement device 20.

Further, when ordering of the spectacle lens is performed, the lens ordering part 16 transmits to the order-receiving side controller 30 not only the three-dimensional frame shape data, but also the probe information 17 regarding the probe 21 used by the spectacle frame measurement device 20 that obtains the three-dimensional frame shape data. Therefore, the lens ordering part 16 has a function as a probe information reporting part 18. Namely, when ordering of the spectacle lens is performed, the lens ordering part 16 is configured so that the probe information reporting part 18 reads the probe information 17 from the information memory part 14 and reports it to the order-receiving side controller 30.

The function as the probe information registration processing part 15, the lens ordering part 16, and the probe information reporting part 18, can be realized by executing a prescribed software program by the computer part 13 of the order-side terminal device 10. In this case, the software program may be started as needed by the computer part 13, and may be previously installed in the computer part 13 or may exist in the system so as to be accessible by the computer part 13. When the software program is installed in the computer part 13, it may be provided through the communication line 3 connected to the computer part 13, or may be stored in a computer readable recording medium and provided.

(Function Structure of the Order-Receiving Side Controller)

On the other hand, the order-receiving side controller 30 has a function as a job reception part 31 and an edging shape calculation part 32.

The job reception part 31 receives an order from the order-side terminal device 10, and manages each kind of processing to be performed in accordance with the order content, as a processing job. Specifically, the job reception part 31 selects an edger 40, etc., that executes processing in accordance with the order content, for each order (job) from the order-side terminal device 10, and gives an instruction to the selected edger 40 to perform an edging processing operation.

Further, since the probe information 17 is transmitted together with the three-dimensional frame shape data at the time of ordering from the order-side terminal device 10, the job reception part 31 recognizes the probe information 17 transmitted from the order-side terminal device 10 when the order is received. Therefore, the job reception part 31 has a function as a probe information recognition part 33. Namely, the job reception part 31 is configured so that when the order from the order-side terminal device 10 is received, the probe information recognition part 33 extracts the probe information 17 included in the order content, and recognizes the content of the extracted probe information 17. By recognizing the content of the probe information 17 by the probe information recognition part 33, the abutting mode of the probe 21 against the inner circumferential groove of the spectacle frame indicated by the probe information 17, can be grasped at the side of the order-receiving controller 30.

The edging shape calculation part 32 creates lens edging shape data required for edging, etc., by the edger 40, based on the three-dimensional frame shape data transmitted from the order-side terminal device 10. However, when the lens edging shape data is created, the edging shape calculation part 32 performs data correction described later in detail, while reflecting the abutting mode of the probe 21 indicated by the probe information 17, based on a result of recognizing the content of the probe information 17 by the probe information recognition part 33. Thus, as described later in detail, the lens edging shape data created by the edging shape calculation part 32, is the data in consideration of a difference of the abutting mode against the inner circumferential groove of the spectacle frame, whichever shapes is taken by the probe 21, namely, this is the data subjected to suitable size correction.

Similarly to the abovementioned case of the order-side terminal device 10, the function as the job reception part 31, the probe information recognition part 33, and the edging shape calculation part 32 can be realized by executing a prescribed software program by the function as the computer device in the order-receiving side controller 30. In this case, the software program may be started as needed by the order-receiving side controller 30, and may be previously installed in the order-receiving side controller 30 or may exist in the system so as to be accessible by the order-receiving side controller 30. When the software program is installed in the order-receiving side controller 30, it may be provided through the communication line 3 connected to order-receiving side controller 30, or may be stored in a computer readable recording medium and provided.

<3. Manufacturing Procedure of a Spectacle Lens>

A manufacturing procedure of a spectacle lens using the lens edging system of this embodiment, will be describe next.

First, a rough outline of the manufacturing procedure of a spectacle lens will be described, with reference to FIG. 1.

In the lens edging system of this embodiment, when ordering of the spectacle lens is performed to the edging center 2 from the spectacle shop 1, first, the data regarding the kind of the lens, the material of the lens, and the prescription value, etc., of the lens is inputted in the order-side terminal device 10, and the three-dimensional frame shape of the spectacle frame desired by the client is measured by the spectacle frame measurement device 20 (step 101, the step is abbreviated as "S" hereafter), and the three-dimensional frame shape data as a measurement result is reported to the order-side terminal device 10. Then, ordering of the spectacle lens desired by the client (that can be framed into the spectacle frame desired by the client) is performed to the order-receiving side controller 30 from the order-side terminal device 10.

At this time, the input data regarding the kind of the lens, the material of the lens, and the prescription value, etc., of the lens is transmitted to the order-receiving side controller 30 from the order-side terminal device 10, and the probe information 17 regarding the probe 21 used by the spectacle frame measurement device 20 is also transmitted to the order-receiving side controller 30, together with the three-dimensional frame shape data reported from the spectacle frame measurement device 20 (S102).

When the order from the order side controller 30 is received, the order-receiving side controller 30 recognizes the order content, and starts an edging job to the ordered spectacle lens. Specifically, the order-receiving side controller 30 creates the lens edging shape data required for edging, etc., by the edger 40, based on the three-dimensional frame shape data transmitted from the order-side terminal device 10. At this time, since the probe information 17 is transmitted together with the three-dimensional frame shape data from the order-side terminal device 10, the order-receiving side controller 30 performs creation of the lens edging shape data after data correction is performed reflecting the abutting mode of the probe 21 indicated by the probe information 17.

Then, when the lens edging shape data is created, the order-receiving side controller 30 gives an instruction to the edger 40 to perform edging to the spectacle lens, using the created lens edging shape data. The edger 40 creates edging locus data for specifying a moving locus of an edging tool based on the lens edging shape data, while following the instruction from the order-receiving side controller 30, and performs edging using this edging locus data, to thereby edge the circumferential edge portion of the uncut lens into a shape that can be framed into the spectacle frame as desired by the client (S103).

When edging is performed by the edger 40, the edging shape of the lens circumferential edge portion of the spectacle lens after edging is measured by the shape measurement device 50, and if the spectacle lens is judged to be a quality one from the measurement result (S104), the spectacle lens is delivered to the spectacle shop 1 which is the order source, from the edging center (S105).

When the spectacle lens thus delivered is received, the received spectacle lens is framed into the spectacle frame desired by the client, to complete a spectacle at the spectacle shop 1 which is the order source (S106). Then, the completed spectacle is delivered to the client.

In the lens edging system, measurement of the frame shape of the spectacle frame, ordering of the spectacle lens, and edging, etc., of the spectacle lens in accordance with the order content, are performed in the abovementioned flow.

Each processing of them will be sequentially described hereafter in detail.

(3-1. Measurement Processing of the Frame Shape of the Spectacle Frame)

A measurement processing of the frame shape of the spectacle frame performed by the spectacle frame measurement device 20 will described first.

The spectacle frame measurement device 20 measures the three-dimensional frame shape of the spectacle frame by making the probe (stylus) 21 abut on the inner circumferential groove of the spectacle frame, and in this state, moving the probe 21 along the inner circumferential groove of the spectacle frame. Details of the measurement of the three-dimensional frame shape using the probe 21 are publicly-known (for example, see Japanese Patent Laid Open Publication No. 2004-3943, and Japanese Patent Laid Open Publication no. 2007-32797), and therefore explanation therefore is omitted here.

Incidentally, the shape, etc., of the probe 21 used by the spectacle frame measurement device 20 is sometimes different, depending on the model of the spectacle frame measurement device 20.

Figure 3:
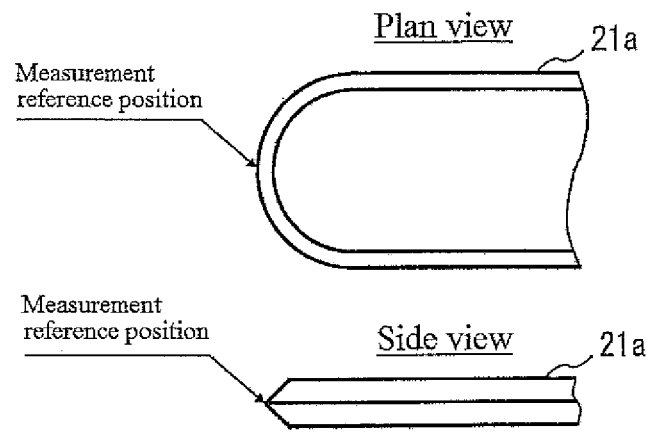
FIG. 3 is an explanatory view (No. 1) showing a specific example of a shape, etc., of a probe used by a spectacle frame measurement device according to an embodiment of the present invention.
Figure 3:
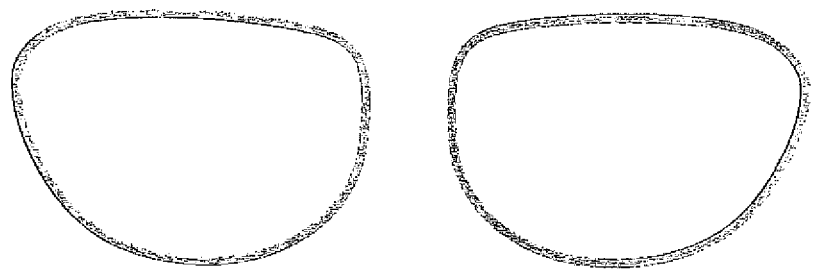
Figure 3:
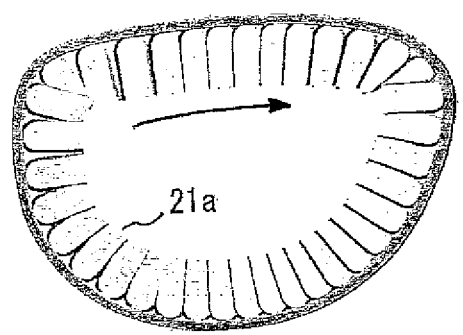
Figure 4:
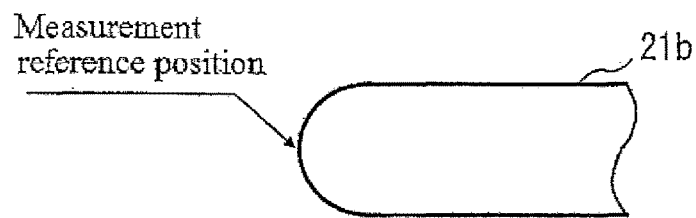
FIG. 4 is an explanatory view (No. 2) showing a specific example of a shape, etc., of a probe used by a spectacle frame measurement device according to an embodiment of the present invention.
Figure 4:
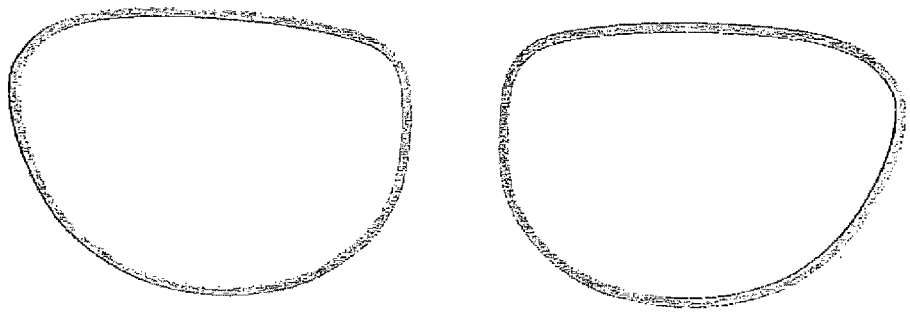
Figure 4:
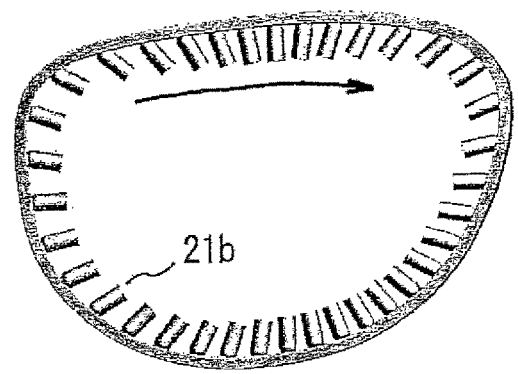

FIG. 3 and FIG. 4 are explanatory views showing a specific example of the shape, etc., of the probe 21 used by the spectacle frame measurement device 20.

A probe 21a shown in FIG. 3 has a flat plate-like stylus shape. More specifically, as shown in FIG. 3(a), the tip portion of the probe 21a is formed in substantially U-shape in plan view, and in substantially V-shape in side view. Then, a measurement reference position is set at a top position of the tip portion. When the frame shape of the spectacle frame shown in FIG. 3(b) is measured using the probe 21a with this structure, as shown in FIG. 3(c), the tip portion of the probe 21a is abut on the inner circumferential groove of the spectacle frame, and in this state, the probe 21a is moved in a circumferential direction along the inner circumferential groove of the spectacle frame. A moving direction is not particularly limited. Then, a locus of the probe 21a at the measurement reference position at the time of moving the probe 21a on the whole circumference, is formed as the three-dimensional frame shape data. Thus, the measurement is performed for each inner circumferential frame of the lens for a left eye and a right eye respectively.

The probe 21b shown in FIG. 4 has a spherical stylus shape. More specifically, as shown in FIG. 4(a), the tip portion of the probe 21b is formed into a spherical shape. Then, the measurement reference position is set at the top position of the tip portion. When the frame shape of the spectacle frame shown in FIG. 4(b) is measured using the probe 21b with this structure, as shown in FIG. 4(c), the tip portion of the probe 21b is abut on the inner circumferential groove of the spectacle frame, and in this state, the probe 21b is moved in the circumferential direction along the inner circumferential groove of the spectacle frame. The moving direction is not particularly limited. Then, the locus of the probe 21b at the measurement reference position at the time of moving the probe 21b on the whole circumference, is formed as the three-dimensional frame shape data regarding the spectacle frame. Thus, the measurement is performed for each inner circumferential frame of the lens for a left eye and a right eye respectively.

Thus, regarding the probes 21a and 21b having different shapes from each other, even when the frame shape of the same spectacle frame is measured, abutting (abutting modes) of the probes 21a and 21b against the inner circumferential groove of the spectacle frame, are possibly different from each other. Particularly, the frame shape of the spectacle frame is not planar, and is displaced in a lens optical axis direction (Z-axis direction) under an influence of a frame curve or a frame tilt angle, etc. Further, when the abutting mode is viewed in each cross-sectional surface of the frame, usually the abutting mode is always different depending on a position in the circumferential direction. Therefore, when the probes 21a and 21b are moved in the circumferential direction along the inner circumferential groove of the spectacle frame, the abutting modes of the probes 21a and 21b are greatly different depending on the abutting position against the inner circumferential groove.

Figure 5:
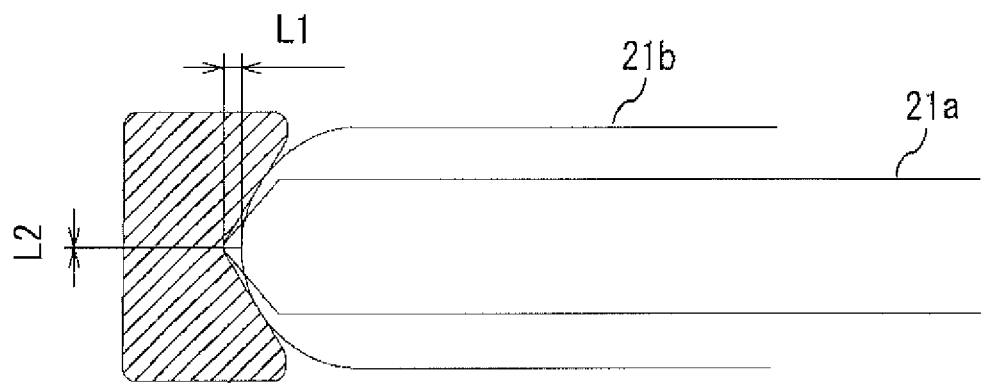
FIG. 5 is an explanatory view specifically showing that an abutting mode on an inner circumferential groove of a spectacle frame is different depending on a probe used by a spectacle frame measurement device.
Figure 5:
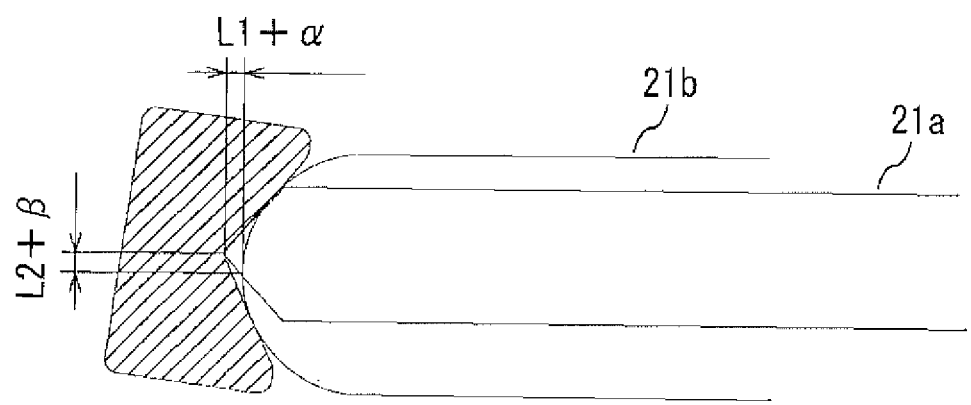

FIG. 5 is an explanatory view specifically showing that the abutting mode is different depending on the shapes of the probes 21a and 21b.

FIG. 5(a) shows the difference of the abutting mode between the probes 21a and 21b in a direction rotated by 290° (for example, see FIG. 6(b)) clockwise from 0° direction, with a frame center as a center, when the whole circumference of the inner circumferential groove of the spectacle frame is 360°, and a specific direction (for example, a nasal side direction on a straight line passing through the frame center and extending in a horizontal direction if the lens is for a right eye, and an ear-side direction on the straight line passing through the frame center and extending in the horizontal direction if the lens is for the left eye) is set as 0° direction.

Also, FIG. 5(b) shows the difference of the abutting modes between the probes 21a and 21b in a direction (for example, see FIG. 6(b)) rotated by 180° clockwise from 0° direction, with the frame center as a center, when the whole circumference of the inner circumferential groove of the spectacle frame is 360°, and a similar specific direction as the case of FIG. 5(a) is set as 0° direction.

When the abutting modes shown in FIG. 5(a) and FIG. 5(b) are compared, it is found that the difference of the abutting modes is generated between the probes 21a and 21b, and the difference of the abutting modes is also generated between the case of 290° direction and the case of 180° direction. Specifically, deviation is generated between the measurement reference position of the probe 21a and the measurement reference position of the probe 21b by distance L1 in a lateral direction of the figure and by distance L2 in a vertical direction of the figure in the case of 290° direction, and meanwhile, deviation is generated by distance L1+α in the lateral direction of the figure and by distance L2+β in the vertical direction of the figure in the case of 180°. Thus, a reason for generating the difference of the abutting mode depending on the abutting position, is that there is an influence of the frame curve or the frame tilt angle, etc., of the spectacle frame. That is, the frame shape of the spectacle frame is a three-dimensional solid shape, and is influenced by the frame curve and the frame tilt angle, etc., and therefore the difference of the abutting modes between the probes 21a and 21b is not uniform over the whole circumference of the inner circumferential groove of the spectacle frame.

Such a difference of the abutting modes can also be generated not only by the influence of the frame curve and the frame tilt angle, etc., but also by an interference of the tip portions of the probes 21a and 21b, and the inner circumferential groove of the spectacle frame.

As described above, even when the frame shape of the same spectacle frame is measured, the difference of the abutting modes on the spectacle frame is generated between the probes 21a and 21b having mutually different shapes. Accordingly, the difference is also generated between three-dimensional frame shape data measured using the probes 21a and 21b, in accordance with the difference of the abutting modes between the probes 21a and 21b.

Figure 6:
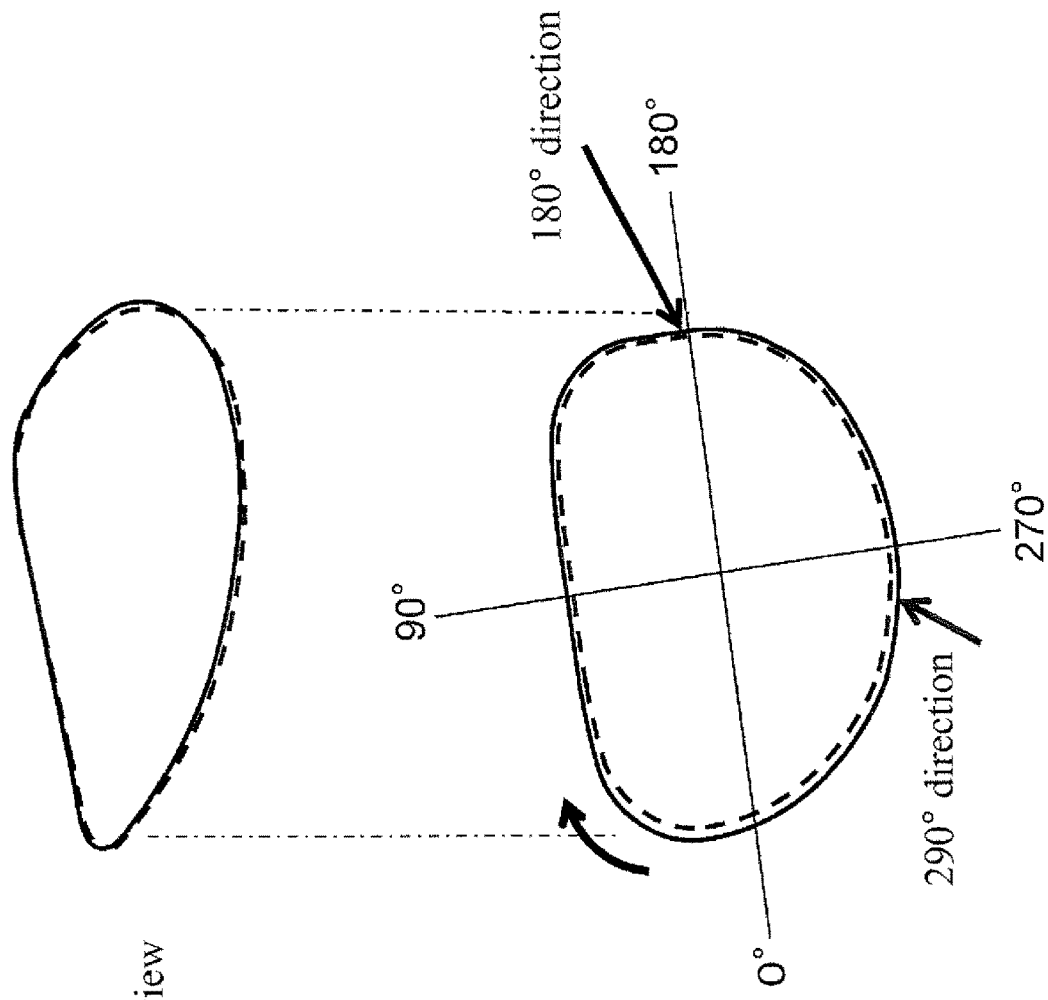
FIG. 6 is an explanatory view specifically showing that three-dimensional frame shape data as a measurement result is different depending on a probe used by a spectacle frame measurement device.

FIG. 6 is an explanatory view specifically showing that the three-dimensional frame shape data is different depending on the shapes of the probes 21a and 21b.

In the figure, the three-dimensional frame shape data measured using the probe 21a is shown by solid line, and the three-dimensional frame shape data measured using the probe 21b is shown by broken line respectively. Both three-dimensional frame shape data are the data for the frame shape of the same spectacle frame.

According to these three-dimensional frame shape data, it is found that the data is different from each other even in the case of the frame shape of the same spectacle frame, and a degree of the difference is different depending on the abutting positions of the probes 21a and 21b.

Such a difference of the three-dimensional frame shape data has a direct influence on a result of edging of the spectacle lens, and therefore the difference should be eliminated in the case of measuring the frame shape of the same spectacle frame. However, the degree of the difference is different depending on the abutting positions of the probes 21a and 21b. Therefore even if the same size correction is uniformly applied as a conventional technique, this is not necessarily a suitable processing. Therefore, in the lens edging system of this embodiment, as described later in detail, the probe information 17 regarding the probe 21 of the spectacle frame measurement device 20 is exchanged between the order-side terminal device 10 and the order-receiving side controller 30.

(3-2. Ordering Processing of the Spectacle Lens)

Subsequently, an ordering processing of the spectacle lens performed by the order-side terminal device 10 will be described.

Figure 7:
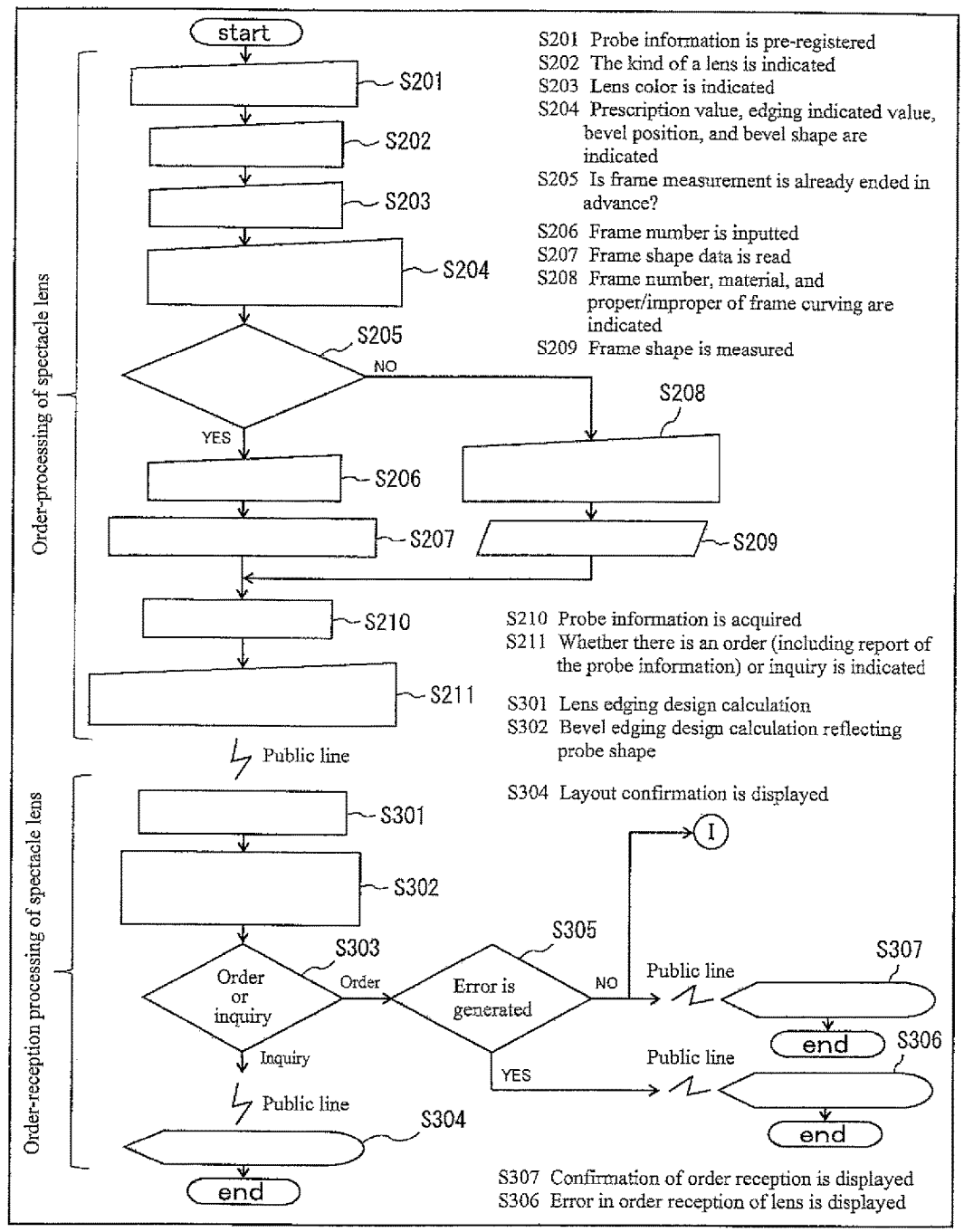
FIG. 7 is a flowchart showing an example of an ordering and order-receiving procedure of a spectacle lens in a lens edging system according to an embodiment of the present invention.

FIG. 7 is a flowchart showing an example of the ordering processing of the spectacle lens in the lens edging system of this embodiment. Note that a gray portion in the figure shows a characteristic processing of this embodiment.

In the order-side terminal device 10, prior to ordering of the spectacle lens, pre-registration of the probe information 17 regarding the probe 21 used by the spectacle frame measurement device 20, is performed (S201). The pre-registration of the probe information 17 is started by start of the function as the probe information registration processing part 15 when a prescribed operation is given by the operation part 11 for example. Specifically, the function as the probe information registration processing part 15 in the order-side terminal device 10 performs pre-registration of the probed information 17 in such manner that an information input screen is displayed on the display part 12, then required information is inputted through the operation part 11 by the operator who references the information input screen, and based on an input content of the information, the probe information 17 regarding the spectacle frame measurement device 20 is stored and held in the information memory part 14.

Figure 8:
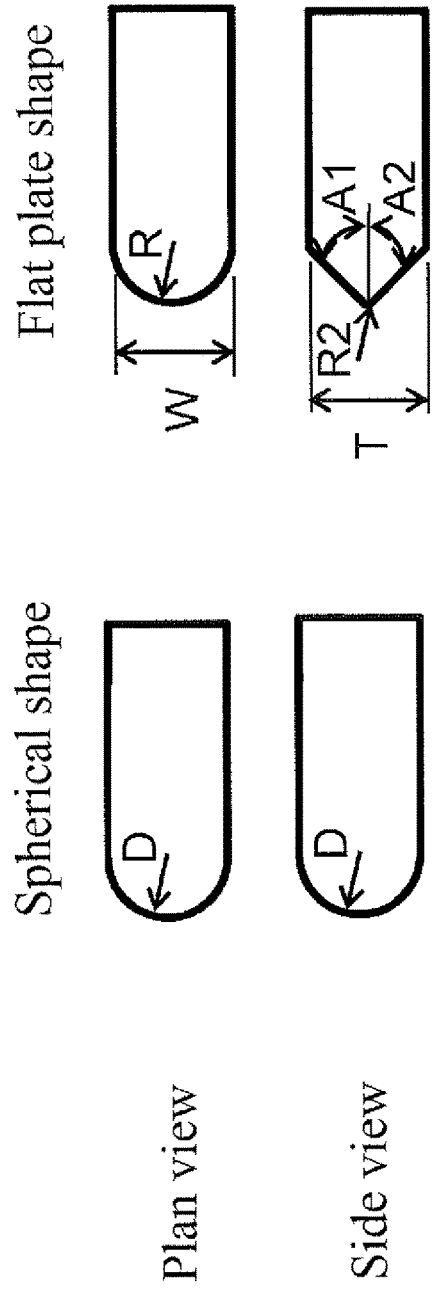
FIG. 8 is an explanatory view specifically showing a pre-registration processing of probe information performed by an order-side terminal device according to an embodiment of the present invention.

FIG. 8 is an explanatory view showing a specific example of the pre-registration processing for the probe information 17 in the order-side terminal device 10.

At the time of the pre-registration of the probe information 17, first, the shape of each kind of probe 21 estimated by the spectacle frame measurement device 20, is displayed on the information input screen by the display part 12. The figure shows a case that the shape of the probe 21 is a flat plate shape and a case that it is a spherical shape, which are respectively displayed in parallel (for example, see FIG. 8(a))). However, when the other shape is estimated, this shape may be displayed together. Then, from the shape displayed on the information input screen, the operator selects the shape of the probe 21 actually used by the spectacle frame measurement device 20, through the operation part 11 utilizing GUI (Graphical User Interface) widget on the information input screen for example, and the operator inputs information regarding a size (dimension value) for specifying the size of the shape, through the operation part 11. As the dimension value thus inputted, for example, specific values b to g for R, W, A1, A2, T, R2 respectively shown in the figure in the case of the flat plate shape, and specific value a for D shown in the figure in the case of the spherical shape, can be given (for example, see FIG. 8(b)). When such selection and input of information are performed, the kind of the shape of the probe 21 (the flat plate shape or the spherical shape, etc.), and its size (dimension value) are indicated. Further, the position as a reference of measurement (measurement reference position) is indicated by the operator thorough the operation part 11, utilizing the shape of the probe 21 displayed on the information input screen. It is conceivable that the measurement reference position is indicated on the screen in a display state of the shape of the probe 21, by click of the corresponding position (for example, top of the tip part). When there is such an indication, the measurement reference position of the probe 21 is indicated.

Thus, the information for specifying the kind of the shape of the probe 21 (the flat plate shape or the spherical shape, etc.), its size (dimension value), and the position as a reference for measurement (for example, the position of the top of the tip portion) is inputted in the order-side terminal device 10, and stored and held in the information memory part 14. Namely, thus, the pre-registration of the probe information 17 of the probe 21 is performed in the information memory part 14.

It is conceivable that the pre-registration of the probe information 17 is performed while referencing a specification or a design drawing, etc., of the spectacle frame measurement device 20, or actually referencing (including measuring a dimension, etc.) the probe 21 of the spectacle frame measurement device 20.

Here, explanation is given for a case that the pre-registration of the probe information 17b is performed by inputting information through the operation part 11 for example. However, the present invention is not necessarily limited thereto, and for example it is conceivable to perform pre-registration by acquiring the corresponding probe information 17 from a data server that exists on the communication line 3 for example.

Further, the probe information 17 stored and held in the information memory part 14 by the pre-registration, is not particularly limited in its data form, and may be acceptable if it can specify the shape, etc., of the probe 21, and if it can be exchanged between the order-side terminal device 10 and the order-receiving side controller 30.

When the pre-registration of the probe information 17 is ended, thereafter, the order-side terminal device 10 is set in an order mode or an inquiry mode (simply called an "order, etc." hereafter) of ordering the spectacle lens to the order-receiving side controller 30. The order, etc., of the spectacle lens is performed in the order-side terminal device 10, by starting the function as the lens ordering part 16, when there is a prescribed operation through the operation part 11 for example.

When the order, etc., of the spectacle lens is performed, as shown in FIG. 7, in the order-side terminal device 10, the function as the lens ordering part 16 displays an order entry screen on the display part 12. The operator of the order-side terminal device 10 indicates the kind of the spectacle lens to be ordered, through the operation part 11 while seeing the order entry screen (S202). Specifically, the operator indicates the kind of the lens (including the material of the lens), or indicates whether the lens to be ordered is subjected to bevel edging or it is an uncut lens, or indicates to edge the lens so that a thickness of the lens is minimum, or indicates necessity/non-necessity for chamfering or polishing, etc. The operator of the order-side terminal device 10 also indicates a lens color through the operation part 11 (S203). Further, the operator of the order-side terminal device 10 indicates the lens prescription value, etc., through the operation part 11 (S204). Specifically, a prescription value of the lens, an edging indicated value of the lens, information regarding the spectacle frame, layout information for specifying an eye point position, a bevel mode, a bevel position, and a bevel shape, etc., are inputted in the order-side terminal device 10. The bevel mode is selected depending on where the bevel is formed on the edge of the lens, namely, selected from "1:1", "1:2", "convex copying", "frame copying", and "automatic bevel", and the selected bevel mode is inputted. Here, for example, the "convex copying" is the mode of forming the bevel along a lens surface (front surface). Input of the bevel position is effective only in the bevel mode of "convex copying", "frame copying", and "automatic bevel", thereby indicating how much in a rear surface side direction from the lens surface, a surface side bevel bottom should be positioned, which is indicated by 0.5 mm unit for example.

Here, regarding the spectacle frame to be ordered, the operator of the order-side terminal device 10 judges whether or not the measurement of the three-dimensional frame shape by the spectacle frame measurement device 20 is completed (S205).

Then, when the measurement of the three-dimensional frame shape is already performed, and the three-dimensional frame shape data as the measurement result is stored in the order-side terminal device 10 or the spectacle frame measurement device 20, the frame number which is the attached information for identifying the spectacle frame, is inputted in the order-side terminal device 10 through the operation part 11, to thereby read the stored three-dimensional frame shape data (S206). When the frame number of the spectacle frame is inputted, the order-side terminal device 10 reads and acquires the stored three-dimensional frame shape data regarding the corresponding spectacle frame (S207).

Meanwhile, if the measurement of the three-dimensional frame shape is not completed, the operator of the order-side terminal device 10 inputs the frame number attached to the spectacle frame whose shape is to be measured hereafter, and indicates the material of the frame (metal or plastic, etc.), and further indicates proper/improper of frame curving (S208).

Thereafter, the spectacle frame whose shape is to be measured hereafter, is fixed to the spectacle frame measurement device 20, and the measurement of the frame shape of the spectacle frame is started (S209). When the spectacle frame to be measured is fixed to the spectacle frame measurement device 20, the spectacle frame measurement device 20 makes the probe 21 abut on the inner circumferential groove of the right and left frames of the spectacle frame, and moves the probe 21 in the circumferential direction along the inner circumferential groove of the spectacle frame, to thereby measure the three-dimensional frame shape of the spectacle frame and report the measurement result to the order-side terminal device 10.

The order-side terminal device 10 performs smoothing of the reported data as needed, and calculates center coordinates of a tonic surface, base radius, a cross radius, a rotational symmetry axis unit vector, or a frame curve (curvature of a spherical surface when the frame is regarded as being on the spherical surface), a circumferential length of the inner circumferential groove, frame PD (pupil distance), frame nose width, size A and size B as a horizontal and vertical maximum width of the frame, an effective diameter (a twice value of the maximum diameter), and a tilt angle formed by right and left frames. Then, these calculated data is displayed on the display part 12. When there is a large disturbance or a large difference between the shapes of the right and left frames, an error message is displayed on the display part 12. When the error message is displayed on the display part 12, the operator of the spectacle shop 1 checks the content of the error message, and performs measurement again.

Thus, the order-side terminal device 10 acquires the three-dimensional frame shape data regarding the corresponding spectacle frame, from the spectacle frame measurement device 20.

When the three-dimensional frame shape data is acquired regarding the spectacle frame to be ordered, subsequently, the order-side terminal device 10 reads and acquires the probe information 17 regarding the probe 21 used by the spectacle frame measurement device 20 that measures the three-dimensional frame shape data, from the information memory part 14 (S210).

Thereafter, the order-side terminal device 10 creates order data to be transmitted to the order-receiving side controller 30, collectively with each kind of data obtained in the abovementioned each step. The order data includes not only the kind of the lens of the spectacle lens, the material of the lens, and the prescription value, etc., of the lens of the spectacle lens to be ordered, and the three-dimensional frame shape data regarding the spectacle frame to be ordered, but also the probe information 17 of the spectacle frame measurement device 20 for measuring the three-dimensional frame shape data. Then, the order-side terminal device 10 transmits the order data to the order-receiving side controller 30, together with an indication of "inquiry" or "order" (S211). Thus, the three-dimensional frame shape data required for the order, etc., of the spectacle lens is transmitted to the order-receiving side controller 30, and the probe information 17 of the spectacle frame measurement device 20 is also reported together. In addition, the display part 12 of the order-side terminal device 10 displays a message showing that data is being transmitted, while transmitting data to the order-receiving side controller 30.

(3-3. Order-Reception Processing of the Spectacle Lens)

An order-reception processing of the spectacle lens performed by the order-receiving controller 30, will be described next.

When the order data is transmitted from the order-side terminal device 10, the order-receiving side controller 30 starts the function as the job reception part 31, and receives the order data. At this time, the probe information 17 included in the order data is extracted and recognized by the probe information recognition part 33.

Further, when the order data is received from the order-side terminal device 10, the order-receiving side controller 30 starts the function as the edging shape calculation part 32. Then, as shown in FIG. 7, a lens edging design calculation is performed by the edging shape calculation part (S301). In the lens edging design calculation, based on the three-dimensional frame shape data of the spectacle frame, the lens prescription value, and the layout information, etc., the whole body of the lens before edging is determined, which is indicated by a lens outer diameter, curves of front and rear sides of the lens, and a thickness of the lens, etc. Regarding a specific method, etc., a publicly-known technique may be utilized (for example, see Patent Publication No. 3075870), and therefore explanation therefore is omitted here. The abovementioned calculation processing is required for a case when polishing is performed to the lens. When a stock lens is indicated, and the polishing, etc., is not performed before edging, unnecessary lens edging design calculation can be omitted.

After the lens edging design calculation, subsequently, a bevel design calculation is performed by the edging shape calculation part 32 in the order-receiving side controller 30 (S302). In the bevel design calculation, the shape of the lens circumferential edge portion after edging is determined by carrying out a three-dimensional bevel design calculation, based on the three-dimensional frame shape data and the layout information, etc., of the spectacle frame. Thus, the edging shape calculation part 32 creates the lens edging shape data required for the edging by the edger 40. Regarding a specific method, etc., of the bevel design calculation for creating the lens edging shape data, a publicly-known technique may be utilized (for example, see Patent Publication No. 3075870), and therefore explanation therefore is omitted here.

However, the edging shape calculation part 32 is configured so that when the lens edging shape data is created by the bevel design calculation, the bevel design calculation is performed by the publicly-known technique, and also the data correction is performed reflecting the abutting mode of the probe 21 indicated by the probe information 17, based on the probe information 17 included in the order data received by the order-receiving side controller 30.

It is conceivable to perform data correction as described below.

For example, the edging shape calculation part 32 recognizes the shape of the inner circumferential groove of the spectacle frame (for example, a bevel groove at a groove angle of 118°) previously set as a reference, and also recognizes what kind of locus is formed by the inner circumferential groove in the circumferential direction. Also, the edging shape calculation part 32 specifies the shape of the probe 21 used for obtaining the three-dimensional frame shape data based on the probe information 17 recognized by the probe information recognition part 33. Then, the edging shape calculation part 32 obtains the abutting mode of the probe 21 against the inner circumferential groove of the spectacle frame, including presence/absence of the interference between them, using a geometric calculation and simulation, etc. From this result, the edging shape calculation part 32 obtains a deviation amount between the measurement reference position of the probe 21 for creating the three-dimensional frame shape data, and the measurement reference position of a previously set stylus shape (for example, the spherical shape) as a reference (for example, see L1, L2, L1+α, L2+β, etc.). This is performed at each measurement point set over the whole circumference of the frame. Then, the edging shape calculation part 32 creates the lens edging shape data by performing data correction by the obtained deviation amount, to the three-dimensional frame shape data. Specifically, the data correction is performed so that the deviation from the reference stylus shape is canceled. Accordingly, for example when the spherical stylus shape is set as a reference, the data correction is not required to be performed for the measurement result obtained by the probe 21b, because the deviation amount is zero. Namely, even in a case that the probe 21 has any kind of the stylus shape, the measurement result by using the reference stylus shape can be obtained after the data correction, and based on this measurement result, calculation, etc., of the frame data (circumferential length, size A, size B, tilt angle, and distance between connections (DBL), and frame curve, etc.), is carried out.

By thus performing the data correction, the lens edging shape data after data correction is the data in consideration of the difference of the abutting mode against the inner circumferential groove of the spectacle frame, whichever shapes is taken by the probe 21, namely, this is the data subjected to suitable size correction.

After the lens edging shape data is created by the edging shape calculation part 32, whether the order data from the order-side terminal device 10 is the data for indicating the "order" or indicating the "inquiry", is judged by the function as the job reception part 31 in the order-receiving side controller 30 (S303).

When the order data indicates the "inquiry", in the order-receiving side controller 30, the function as the job reception part 31 transmits an inquiry result to the order-side terminal device 10 which is an order source, via the communication line 3. In response thereto, the order-side terminal device 10 makes the display part 12 display a lens expected shape at the time of completing the beveling, or an error state, based on a result of the inquiry sent from the order-receiving side controller 30 (S304). Specifically, the display part 12 displays a layout confirmation view visually displaying an arrangement of the spectacle lens in accordance with the indicated layout information, and a three-dimensional view showing spatially arranged right and left lenses framed into the spectacle frame, viewed from an arbitrary direction, or when an error is generated in the edging design calculation (at least one of the lens edging design calculation and the bevel design calculation), the display part 12 displays a message in accordance with the error content. Then, the operator of the order-side terminal device 10 who sees the display content, performs change or confirmation of the indicated input information as needed.

Meanwhile, when the order data indicates the "order", whether or not the error is generated in the edging design calculation (at least one of the lens edging design calculation and the bevel design calculation), is judged by the function as the job reception part 31 in the order-receiving side controller 30 (S305).

As a result, if the error is generated, the function as the job reception part 31 transmits the message showing the generation of the error, to the order-side terminal device 10 which is the order source, via the communication line 3. In response thereto, the order-side terminal device 10 makes the display part 12 display the message showing "order cannot be received", because the ordered lens is the lens that cannot be edged due to the error generated in the lens edging design calculation or the bevel design calculation (S306).

Further, when the error is not generated, the function as the job reception part 31 transmits the result to the order-side terminal device 10 which is the order source of the lens edging shape data after data correction, and transmits the lens edging shape data after data correction to the edger 40 and gives an instruction to the edger 40 to actually perform edging. Then, the order-side terminal device 10 displays the message on the display part 12 to show that "order is received" (S307). Thus, the operator of the order-side terminal device 10 can confirm the completion of the order regarding the spectacle lens that can be surely framed into the spectacle frame.

(3-4, Edging Processing of the Spectacle Lens)

Next, explanation is given for an edging processing of the spectacle lens performed by the edger 40, etc., at the edging center 2 side, in accordance with the instruction from the order-receiving side controller 30.

Figure 9:
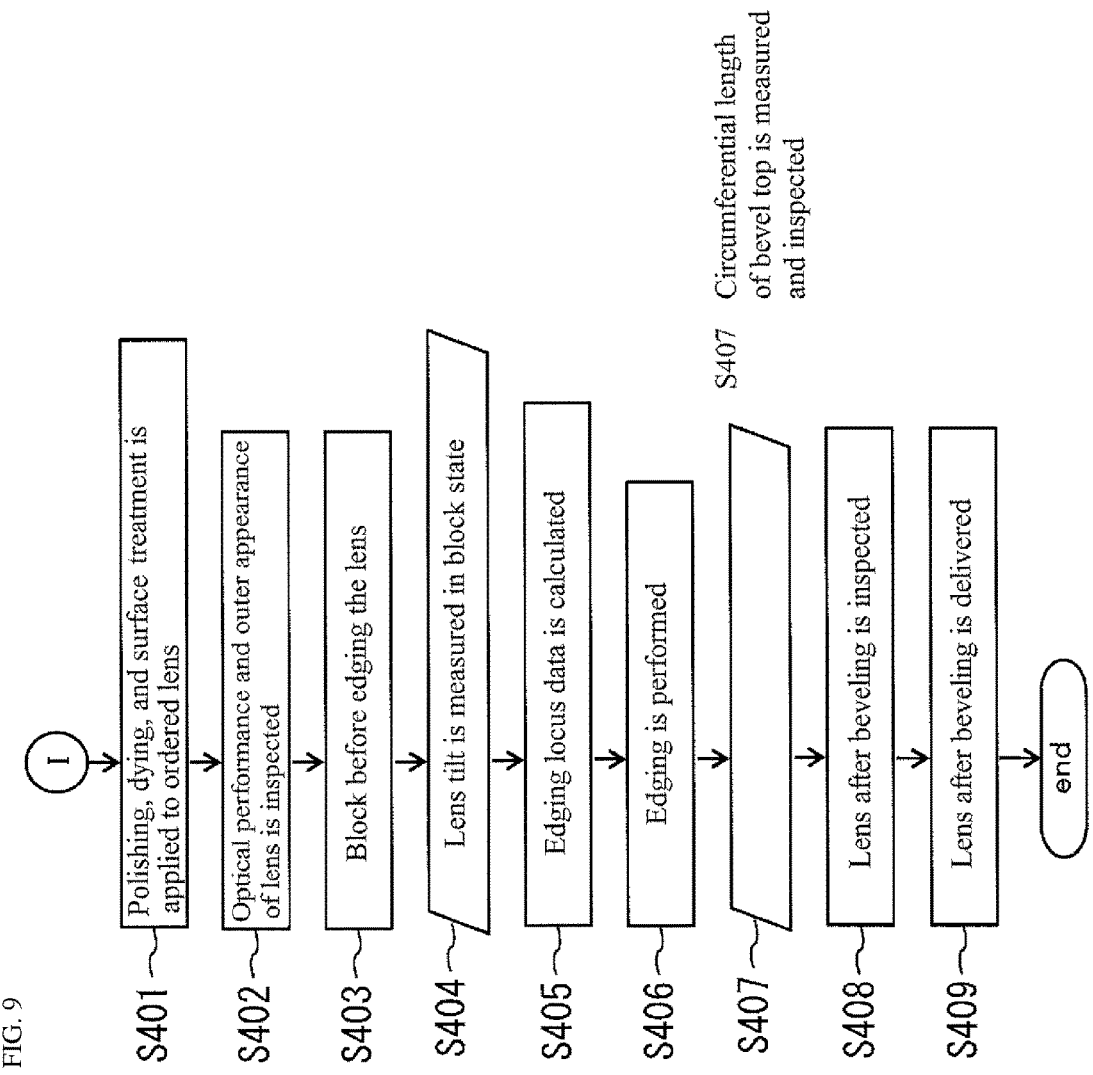
FIG. 9 is a flowchart showing an example of a procedure of processing a spectacle lens in the lens edging system according to an embodiment of the present invention.

FIG. 9 is a flowchart showing an example of a procedure of the edging processing of the spectacle lens in the lens edging system of this embodiment.

At the side of the edging center 2, the "order" is indicated in the order data received by the order-receiving side controller 30, and when the error is not generated in the lens edging design calculation or the bevel design calculation based on the order data, polishing, dying, and surface treatment, etc., are performed to an optical surface of the lens by a device not shown (S401). Namely, processing to be performed before edging, is performed. When use of the stock lens is indicated, which is already subjected to such a kind of processing, these processing step is skipped.

Then, a quality inspection is performed regarding an optical performance and an outer appearance performance of the spectacle lens which is already subjected to processing before edging (S402). Such an inspection is performed using a lens meter and a thickness meter, etc., not shown. When the lens before edging is ordered from the spectacle shop 1, the quality inspection is performed, and thereafter the lens is marked showing an optical center, and showing the layout of the spectacle lens, and the marked lens is delivered to the spectacle shop 1.

Thereafter, based on the result of the bevel design calculation in the order-receiving side controller 30, and by using the mark on the lens as a reference, a block jig for holding a lens is fixed to a prescribed position on the spectacle lens (S403).

The spectacle lens fixed to the block jig, is mounted on the edger 40. Then, in order to grasp a lens position (tilt) in a state of a mount on the edger 40, positions at a previously indicated plurality of places (for example, at least three points on a lens front surface or a lens rear surface) are measured (S404). The measured value thus obtained, is used as calculation data for a calculation processing performed later.

Further, when the spectacle lens fixed to the block jig is mounted on the edger 40, three-dimensional edging locus data is created in the edger 40, by calculation, based on the lens edging shape data transmitted from the order-receiving side controller 30 (S405). At this time, the edger 40 makes the measurement result, etc., of the lens position (tilt) in a mount state, reflect on the calculation. A moving locus on a processing coordinate is indicated by the edging locus data thus created, at the time of performing grinding/edging by an edging tool used by the edger 40.

When the edging locus data is created, the edger 40 performs edging to the spectacle lens in accordance with the edging locus data (S406). Thus, edging and beveling are performed to the circumferential edge portion of the spectacle lens fixed to the block jig, and the spectacle lens edged into the shape that can be framed into the spectacle frame, can be obtained.

Thereafter, the shape measurement device 50 measures the edging shape of the circumferential edge portion of the spectacle lens after edging by the edger 40 (S407). Then, the shape measurement device 50 calculates the circumferential length and the shape of a bevel top on the spectacle lens after edging, from a three-dimensional cylindrical coordinate value of the measured bevel top, and transmits the result to the order-receiving side controller 30.

The order-receiving side controller 30 compares a designed bevel top circumferential length obtained by the bevel design calculation, and the measured value measured by the shape measurement device 50, and judges the lens to be a quality one if the difference between them is within 0.1 mm (S408). In addition, an outer appearance inspection is performed regarding the presence/absence of abnormality such as scratches, burrs, or chipping, etc., and if abnormality is not generated, the lens is judged to be a quality one.

The quality lens subjected to such an inspection, is delivered to the spectacle shop 1 which is the order source, from the edging center 2 (S409).

<4. Effect of this Embodiment>

According to this embodiment, the following effect can be obtained.

In this embodiment, the probe information 17 regarding the probe 21 of the spectacle frame measurement device 20 is stored and held, and the data correction reflecting the abutting mode of the probe 21 indicated by the probe information 17, is performed to thereby create the lens edging shape data. Namely, the abutting mode of the probe 21 on the inner circumferential groove of the spectacle frame is indicated, using the probe information 17 regarding the probe 21 of the spectacle frame measurement device 20, and the data correction reflecting the abutting mode of the probe 21 is performed, to thereby convert the three-dimensional frame shape data obtained by the spectacle frame measurement device 20, to new shape data of the lens edging shape data.

Accordingly, in this embodiment, the data correction reflecting the abutting mode of the probe 21, can be performed to the three-dimensional frame shape data which is the measurement result obtained by the spectacle frame measurement device 20, regardless of the model of the spectacle frame measurement device 20 and the stylus shape of the probe 21 used by the spectacle measurement device 20. Specifically, even in a case of three-dimensional frame shape data A obtained by the measurement using the stylus shape (for example the flat plate shape) of the spectacle frame measurement device of A corporation, or three-dimensional frame shape data B obtained by the measurement using the stylus shape (for example the spherical shape) of the spectacle frame measurement device of B corporation, the data correction can be individually performed reflecting the abutting mode of each probe, without uniformly applying the previously set same size correction value as conventional. Therefore, a suitable size correction can be performed to each of the three dimensional frame shape data A and B (that is, the correction for equalizing both sizes). In addition, the abutting mode of the probe 21 is indicated, and thereafter the data correction reflecting the abutting mode is performed. Therefore, there is no necessity for previously setting the size correction value individually for all spectacle frames having various frame shapes, and there is no problem in the system operation.

Namely, according to this embodiment, the suitable size correction can be performed to the three-dimensional frame shape data of any kind of the spectacle frame, regardless of the stylus shape of the probe 21 in the spectacle frame measurement device 20. Therefore, by performing edging to the spectacle lens based on the lens edging shape data reflecting the correction result, a sufficient accuracy can be secured for edging the spectacle lens so that the lens is framed into the spectacle frame, and as a result, it is possible to construct a mechanism of supplying the spectacle lens that can be framed into the spectacle frame with high quality.

Further, in this embodiment, the probe information 17 is stored and held in the order-side terminal device 10, and the probe information 17 is reported to the order-receiving side controller 30 from the order-side terminal device 10, and the data correction reflecting the abutting mode of the probe 21 is performed in the order-receiving side controller 30. Namely, the probe information 17 is exchanged between the order-side terminal device 10 and the order-receiving side controller 30 via the communication line 3.

This mechanism means that the probe information 17 is managed by the spectacle shop 1 at the lens order side. In this case, usually only one spectacle frame measurement device 20 is installed, and it is extremely rare that a plurality of models coexist in the spectacle shop 1. Therefore, there is no possibility that a burden of information management or the like is excessive at the side of the spectacle shop 1.

Meanwhile, in the edging center 2 at a lens order-receiving side, the probe information 17 is received every time there is a lens order from the spectacle shop 1. Namely, in the edging center 2, there is no necessity for uniformly managing the relation between the model of the spectacle frame measurement device 20 and the stylus shape in each model, and even in such a case, the data correction reflecting the abutting mode of various stylus shapes can be performed.

Therefore, according to this embodiment, by managing the probe information 17 at the side of each spectacle shop 1, and exchanging the probe information 17 via the communication line 3, an efficient system structure (namely, system structure capable of suppressing an increase of a processing load or suppressing a complicated structure) can be realized, by performing the suitable size correction in accordance with the stylus shape, even in a case that a plurality of spectacle shops 1 can perform ordering of the spectacle lens to one edging center 2 for example.

Further, in this embodiment, the order-side terminal device 10 disposed at the side of the spectacle shop 1, has the function as the probe information registration processing part 15 for storing and holding the probe information 17 in the information memory part 14. Namely, by the function as the probe information registration processing part 15, the probe information 17 can be previously stored and held in the information memory part 14 by the pre-registration processing, even in a case that the probe information 17 has any kind of content.

Therefore, according to this embodiment, even in a case that the model of the spectacle frame measurement device 20 is changed at the side of the spectacle shop 1 for example, or even in a case that exchange of the probe 21 including change of the shape occurs in the spectacle frame measurement device 20, it is easy to respond to such a situation, and as a result, versatility of the spectacle frame measurement device 20 used at the spectacle shop 1 side, can be secured at a very high level.

<5. Modified Example, Etc.>

Embodiments of the present invention have been described above. However, the abovementioned disclosure content shows one of the exemplary embodiments of the present invention. Namely, a technical scope of the present invention is not limited to the abovementioned exemplary embodiments.

For example, the abovementioned embodiments show a case that the order-side terminal device 10 has the function as the information memory part 14, and stores and holds the probe information 17 at the spectacle shop 1 side, and the probe information 17 is exchanged between the order-side terminal device 10 and the order-receiving side controller 30 via the communication line 3, and the data correction is performed using the probe information 17 at the spectacle shop 1 side. However, the present invention is not limited to the example given in the abovementioned embodiment, and it is conceivable to constitute the other embodiment as descried below.

Here, other embodiment of the present invention (modified example) will be simply described, with reference to the drawings.

Figures 10A, 10B:
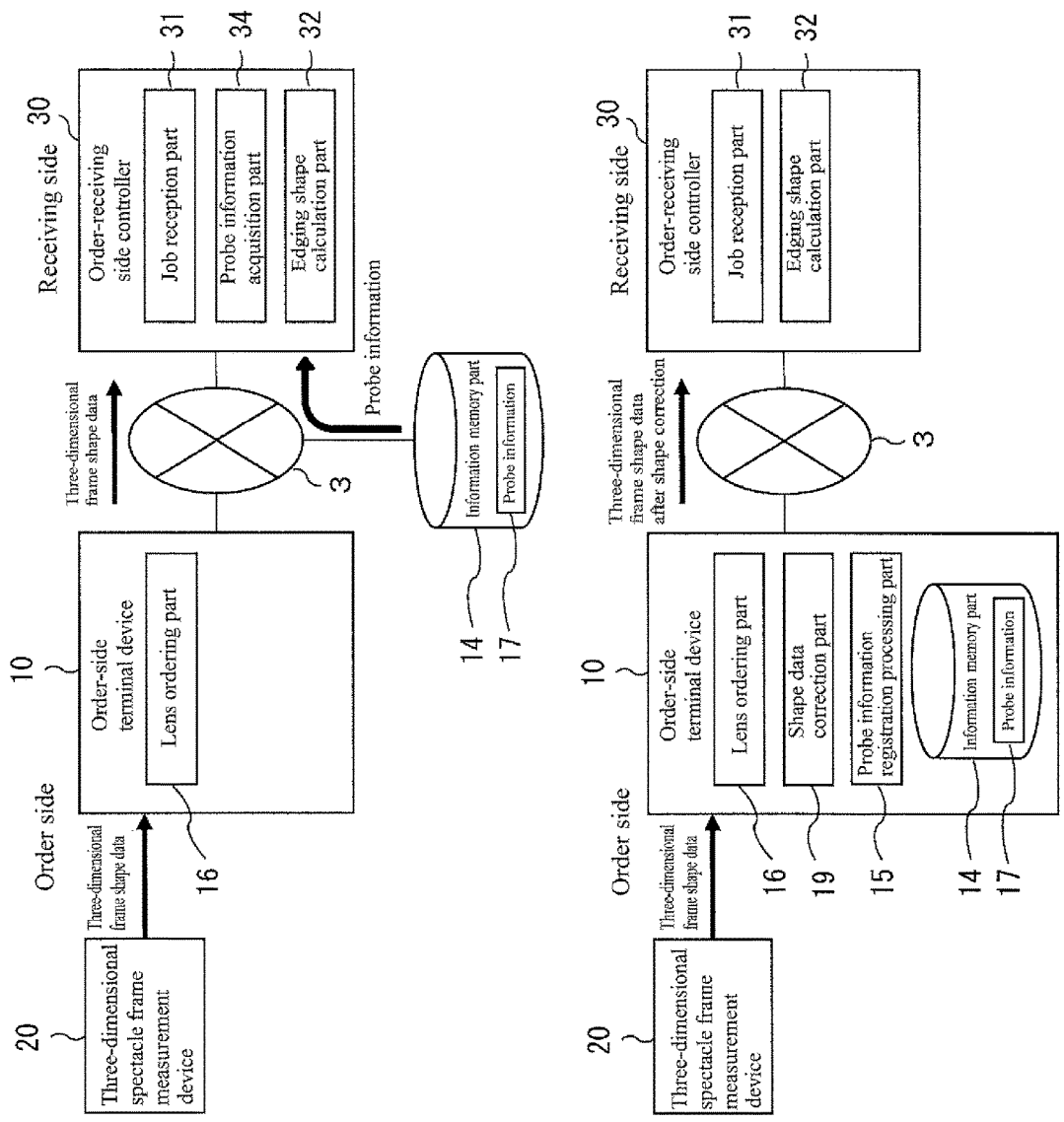
FIG. 10 is a block diagram showing a constitutional example of a function of an essential part of the lens edging system according to an embodiment of the present invention.

FIG. 10 is a block diagram showing a constitutional example of a function of an essential part of the lens edging system according to other embodiment.

In an example shown in FIG. 10(*a*), the information memory part 14 that stores and holds the probe information 17 regarding the spectacle frame measurement device 20, is provided not in the order-side terminal device 10, but at a certain place on the communication line 3 (for example, in a database server of a manufacturer of the spectacle frame measurement device). When ordering of the spectacle lens is performed, the order-side terminal device 10 transmits information for identifying the spectacle frame measurement device 20 (such as model name or model number of the probe) to the order-receiving side controller 30, together with the three-dimensional frame shape data as the measurement result obtained by the spectacle frame measurement device 20. The identifying information may be transmitted by using a publicly-known technique. Meanwhile, the order-receiving side controller 30 has a function as a probe information acquisition part 34 that accesses the information memory part 14 on the communication line 3 to acquire the probe information 17, and when the three-dimensional frame shape data is received from the order-terminal device 10, the order-receiving side controller 30 acquires the probe information 17 regarding the spectacle frame measurement device 20 that obtains the three-dimensional frame shape data. Even in lens edging system with this structure, at the side of the order-receiving side controller 30, the three-dimensional frame shape data obtained from the order-side terminal device 10 can be converted to new shape data of the lens edging shape data, while performing data correction reflecting the abutting mode of the probe 21 indicated by the probe information 17. Namely, similarly to the abovementioned case of the embodiment, a suitable size correction can be performed for any kind of the spectacle frame, regardless of the stylus shape of the probe 21 in the spectacle frame measurement device 20.

In an example shown in FIG. 10(*b*), the order-side terminal device 10 has the function as the shape data correction part 19 that performs data correction reflecting the abutting mode of the probe 21 indicated by the probe information 17 in the information memory part 14, to the three-dimensional frame shape data as the measurement result obtained by the spectacle frame measurement device 20, in addition to the function as the information memory part 14, the probe information registration processing part 15, and the lens ordering part 16. When ordering of the spectacle lens is performed, the order-side terminal device 10 transmits the three-dimensional frame shape data after correction by the shape data correction part 19, to the order-receiving side controller 30. Meanwhile, the order-receiving side controller 30 creates the lens edging shape data based on the three-dimensional shape data after correction obtained from the order-side terminal device 10. Even in the lens edging system with this structure, at the side of the order-receiving side controller 30, the lens edging shape data can be created based on the three-dimensional frame shape data after data correction reflecting the abutting mode of the probe 21 indicated by the probe information 17. Namely, when the lens edging shape data is created, it is possible to obtain the lens edging shape data subjected to the data correction reflecting the abutting mode of the probe 21. Accordingly, even in such a system structure, similarly to the abovementioned case of the embodiment, the suitable size correction can be performed for any kind of the spectacle frame, regardless of the stylus shape of the probe 21 in the spectacle frame measurement device 20.

Thus, in the lens edging system of the present invention, the function of storing and holding at least the probe information 17, and the function of performing the data correction based on the probe information 17, may be provided at a certain place in the system, thus making it possible to perform the suitable size correction not depending on the stylus shape of the probe 21.

DESCRIPTION OF SIGNS AND NUMERALS

1 Spectacle shop (order side)
2 Edging center (manufacturer side)
3 Communication line
10 Order-side terminal device
11 Operation part
12 Display part
13 Computer part
14 Information memory part
15 Probe information registration processing part
16 Lens ordering part
17 Probe information
18 Probe information reporting part
20 Spectacle frame measurement device
21, 21*a*, 21*b* Probe
30 Order-receiving side controller
31 Job reception part
32 Edging shape calculation part
33 Probe information recognition part
40 Edger
50 Shape measurement device

The invention claimed is:

1. A lens edging system, comprising:
a spectacle frame measurement device configured to measure a three-dimensional frame shape of a spectacle frame by abutting a probe on an inner circumferential groove of the spectacle fame;
an order-side terminal device configured to perform ordering of a spectacle lens that can be framed into the spectacle frame whose three-dimensional frame shape data is obtained using three-dimensional frame shape data as a measurement result obtained by the spectacle frame measurement device;
an order-receiving side controller configured to receive an order from the order-side terminal device, and create lens edging shape data based on the three-dimensional frame shape data regarding an order content; and
an edger configured to perform edging to the spectacle lens based on the lens edging shape data created by the order-receiving side controller,
wherein the spectacle frame measurement device and the order-side terminal device are disposed at a spectacle lens order side, and the order-receiving side controller and the edger are disposed at a spectacle lens order-receiving side, and the order-side terminal device and the order-receiving side controller are connected to each other via a communication line,
the lens edging system further comprising:
an information memory part configured to store and hold information regarding a shape of the probe in the spectacle frame measurement device as probe information, the information memory part included in the order-side terminal device or provided at a location on the communication line; and
an edging shape calculation part included in the order-receiving side controller and configured to specify an abutting mode on the inner circumferential groove of the probe indicated by the probe information over the whole circumference of the spectacle frame, using the probe information stored and held in the information memory part and obtained via the communication line, and perform data correction reflecting the abutting mode of the probe indicated by the probe information when the lens edging shape data is created.

2. The lens edging system according to claim 1, wherein the information memory part is included in the order-side terminal device, and the order-side terminal device includes a probe information reporting part that reads the probe information obtained from the information memory part and reports it via the communication line to the order-receiving side controller, when ordering of a spectacle lens is performed to the order-receiving side controller.

3. The lens edging system according to claim 1, wherein the information memory part is provided at a certain place on the communication line, and the order-receiving side controller includes a probe information acquisition part for acquiring the probe information by accessing the information memory part via the communication line, in addition to the edging shape calculation part.

4. The lens edging system according to claim 1, wherein the information memory part is included in the order-side terminal device, and the order-side terminal device includes a shape data correction part that performs data correction reflecting an abutting mode of the probe indicated by the probe information stored in the information memory part, to three-dimensional shape data as a measurement result obtained by the spectacle frame measurement device, and ordering is performed to the order-receiving side controller using three-dimensional frame shape data after data correction by the shape data correction part at a side of the order-side terminal device.

5. The lens edging system according to claim 2, wherein the order-side terminal device includes a probe information registration processing part for storing and holding the probe information in the information memory part.

6. The lens edging system according to claim 4, wherein the order-side terminal device includes a probe information registration processing part for storing and holding the probe information in the information memory part.

* * * * *